(12) United States Patent
Nakashima et al.

(10) Patent No.: US 11,794,991 B2
(45) Date of Patent: Oct. 24, 2023

(54) INFORMATION PROCESSING DEVICE, INFORMATION PROCESSING METHOD, SYSTEM, AND STORAGE MEDIA

(71) Applicant: TOYOTA JIDOSHA KABUSHIKI KAISHA, Toyota (JP)

(72) Inventors: Toyokazu Nakashima, Nagoya (JP); Takayuki Hatori, Nagakute (JP); Shuichi Sawada, Nagoya (JP); Daiki Kubo, Toyota (JP); Tomoki Ishikawa, Nagoya (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 17/485,703

(22) Filed: Sep. 27, 2021

(65) Prior Publication Data

US 2022/0106111 A1 Apr. 7, 2022

(30) Foreign Application Priority Data

Oct. 1, 2020 (JP) .................................. 2020-167236

(51) Int. Cl.
  *B65F 1/14* (2006.01)
  *G06Q 10/08* (2023.01)
  *G06Q 10/087* (2023.01)

(52) U.S. Cl.
  CPC ......... *B65F 1/1484* (2013.01); *G06Q 10/087* (2013.01); *B65F 2210/128* (2013.01); *B65F 2210/182* (2013.01)

(58) Field of Classification Search
  CPC .............. B65F 1/1484; B65F 2210/128; B65F 2210/182; B65F 2210/168; B65F 1/06; B65F 1/14; B65F 2210/165; G06Q 10/087; G06Q 30/06; G06F 13/00
  See application file for complete search history.

(56) References Cited

U.S. PATENT DOCUMENTS

| | | | |
|---|---|---|---|
| 11,087,574 B1 * | 8/2021 | Carone | G08B 21/182 |
| 2013/0248389 A1 * | 9/2013 | Cutler | B65F 1/06 206/216 |
| 2015/0366411 A1 | 12/2015 | Yang et al. | |
| 2016/0176630 A1 * | 6/2016 | Shahabdeen | B65F 1/00 206/459.1 |
| 2016/0379468 A1 | 12/2016 | Wu et al. | |
| 2017/0210559 A1 | 7/2017 | Howard et al. | |
| 2017/0243279 A1 * | 8/2017 | Thompson | G01G 23/36 |
| 2017/0313509 A1 * | 11/2017 | Mshamma | B65F 1/062 |
| 2018/0057259 A1 | 3/2018 | Chan et al. | |

(Continued)

FOREIGN PATENT DOCUMENTS

| | | | |
|---|---|---|---|
| JP | 2002-133197 A | 5/2002 | |
| JP | 2016-224650 A | 12/2016 | |

(Continued)

*Primary Examiner* — Tuyen K Vo
(74) *Attorney, Agent, or Firm* — Oliff PLC (57) ABSTRACT

An information processing device includes a control unit that executes: acquiring information on whether a trash bag placed in a trash can contains trash; and placing an order of a product related to the trash or the trash bag based on the number of times a state in which there is the trash in the trash bag is changed to a state in which there is no trash in the trash bag.

22 Claims, 7 Drawing Sheets

(56) References Cited

U.S. PATENT DOCUMENTS

2019/0152698 A1\* 5/2019 Zhao .................. B65F 1/06
2020/0010270 A1 1/2020 Bourn et al.
2022/0051502 A1\* 2/2022 Schwartz .............. H04L 63/101

FOREIGN PATENT DOCUMENTS

| JP | 2020-101899 A | 7/2020 | |
|----|---------------|--------|--|
| KR | 10-2017-0052643 A | 5/2017 | |
| WO | 2013/134124 A1 | 9/2013 | |
| WO | WO-2016040601 A1 \* | 3/2016 | ........... A47L 7/0047 |
| WO | 2019/040946 A1 | 2/2019 | |

\* cited by examiner

| TRASH CAN ID | PRE-EXCHANGE REMAINING QUANTITY | ORDER PLACEMENT THRESHOLD | ORDER PLACEMENT QUANTITY | EXCHANGE COUNTER | SHIPPING DESTINATION |
|---|---|---|---|---|---|
| x x x | x x x | x x x | x x x | x x x | x x x |
| x x x | x x x | x x x | x x x | x x x | x x x |
| x x x | x x x | x x x | x x x | x x x | x x x |
| . . . | . . . | . . . | . . . | . . . | . . . |

FIG. 9

INFORMATION PROCESSING DEVICE, INFORMATION PROCESSING METHOD, SYSTEM, AND STORAGE MEDIA

CROSS-REFERENCE TO RELATED APPLICATION

This application claims priority to Japanese Patent Application No. 2020-167236 filed on Oct. 1, 2020, incorporated herein by reference in its entirety.

BACKGROUND

1. Technical Field

The present disclosure relates to an information processing device, an information processing method, a system, and a storage media.

2. Description of Related Art

A technique for supporting periodical purchase of goods, such as daily necessities, is known. For example, Japanese Unexamined Patent Application Publication No. 2016-224650 (JP 2016-224650 A) discloses a system that executes a process of placing an order of a product related to a beacon device that is triggered by pressing an order button provided for the beacon device. Installation of the beacon device described in JP 2016-224650 A in the vicinity of a place where products are stored, such as a refrigerator or a washroom, makes it possible to order products with a simple operation.

SUMMARY

However, in the prior art, there is room for improvement in that a user has to manage the inventory of the products and place an order by the user.

The present disclosure provides an information processing device, an information processing method, a system, and a storage medium that allow a user to place an order for a product at an appropriate time without having to manage the inventory of the paroduct by themselves.

A first aspect of the present disclosure relates to an information processing device. The information processing device includes a control unit that is configured to execute: acquiring information on whether there is trash in a trash bag disposed in a trash can; and placing an order of a product related to the trash or the trash bag based on the number of times a state in which there is the trash in the trash bag is changed to a state in which there is no trash in the trash bag.

A second aspect of the present disclosure relates to an information processing method. The information processing method includes the following executed by a computer: acquiring information on whether there is trash in a trash bag disposed in a trash can; and placing an order of a product related to the trash or the trash bag based on the number of times a state in which there is the trash in the trash bag is changed to a state in which there is no trash in the trash bag.

A third aspect of the present disclosure relates to a system. The system includes: a trash can configured to transmit information on whether there is trash in a trash bag disposed in the trash can; and a server configured to (i) receive information on whether there is the trash in the trash bag, and place an order of a product related to the trash or the trash bag based on the number of times a state in which there is the trash in the trash bag is changed to a state in which there is no trash in the trash bag.

A fourth aspect of the present disclosure relates to a storage medium. The storage medium stores instructions that are executable by one or more processors and that cause the one or more processors to perform functions including: acquiring information on whether there is trash in a trash bag disposed in a trash can; and placing an order of a product related to the trash or the trash bag based on the number of times a state in which there is the trash in the trash bag is changed to a state in which there is no trash.

According to the present disclosure, a user can place an order for a product at an appropriate time without having to manage the inventory of the product by themselves.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An information processing device that is one of the aspects of the present disclosure includes a control unit. The control unit executes: acquiring information on whether there is trash in a trash bag placed in a trash can; and placing an order of a product related to the trash or the trash bag based on the number of times a state in which there is the trash in the trash bag is changed to a state in which there is no trash in the trash bag. The trash bag is disposed so that it can be removed from the trash can. Trash in the trash can accumulates in the trash bag. Since this trash bag has a capacity, when a certain amount of trash accumulates in the trash bag, the trash is taken out from the trash can together with the trash bag and is discarded. Then, a new trash bag is placed in the trash can. In this way, the trash bag is exchanged as appropriate.

When a new trash bag is placed in the trash can, the state in which there is the trash in the trash bag is changed to a state in which there is no trash inside the trash bag. For example, the weight of the trash bag, the weight of the trash can, the distance from a lid in the trash can to an object (for example, the trash or the trash bag), the volume of the trash bag, and the odor in the trash can change. That is, the weight of the trash bag and the weight of the trash can are decreased, the distance from the lid in the trash can to the trash or the trash bag is increased, the volume of the trash bag is decreased, and the odor in the trash can is decreased. This information can be acquired, for example, by a sensor attached to the trash can. Then, based on this information, it is possible to determine whether the state in which there is the trash in the trash bag is changed to the state in which there is no trash in the trash bag. Then, when the state in which there is the trash in the trash bag is changed to the state in which there is no trash in the trash bag, it means that the trash bag has been exchanged and one trash bag has been consumed. That is, the number of times the state in which there is the trash in the trash bag is changed to the state in which there is no trash in the trash bag correlates with a consumption quantity of the trash bag.

Then, the control unit places an order of the product related to the trash or the trash bag based on the number of times the state in which there is the trash in the trash bag has changed to the state in which there is no trash in the trash bag. Here, the product related to trash is the product that is the cause of the trash. For example, when the trash can is the trash can for throwing away a predetermined product, there is a correlation between the number of times the trash bag is exchanged and the consumption quantity of the predetermined product. For example, when the number of times the state in which there is the trash in the trash bag is changed to the state in which there is no trash in the trash bag exceeds a predetermined number of times, the control unit places an order of the predetermined product in order to replenish the predetermined product. The predetermined number of times may be a number acquired by subtracting a predetermined margin from an inventory quantity. The initial value of the inventory quantity may be input by the user.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

First Embodiment

Figure 1:
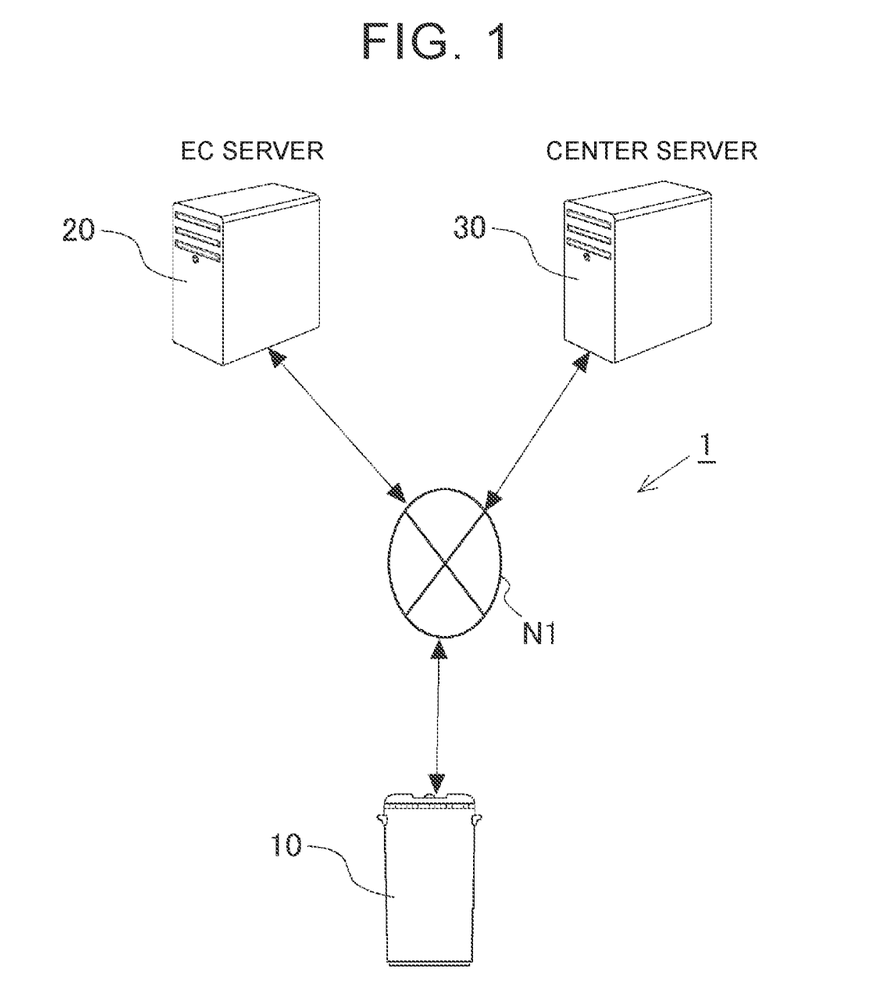
FIG. 1 is a diagram showing a schematic configuration of a system according to a first embodiment.

FIG. 1 is a diagram showing a schematic configuration of a system 1 according to a present embodiment. The system 1 is a system in which a center server 30 detects the exchange of the trash bag by an odor sensor provided in a trash can 10, and the center server 30 places an order of the trash bag to an EC server 20 when the number of times the trash bag is exchanged is equal to or more than a predetermined value.

In the example in FIG. 1, the system 1 includes the trash can 10, the EC server 20, and the center server 30. The trash can 10, the EC server 20, and the center server 30 are connected to each other by a network N1. The trash can 10 is not limited to a household trash can, and may be a trash can installed in a public place, for example.

The network N1 is, for example, a world-wide public communication network such as the Internet, and a wide area network (WAN) or other communication networks may be adopted. In addition, the network N1 may include a telephone communication network such as a mobile phone network or a wireless communication network such as Wi-Fi (registered trademark). Note that FIG. 1 illustrates one trash can 10 and one EC server 20 by way of example. However, there may be a plurality of the trash cans 10 and the EC servers 20.

Figure 2:
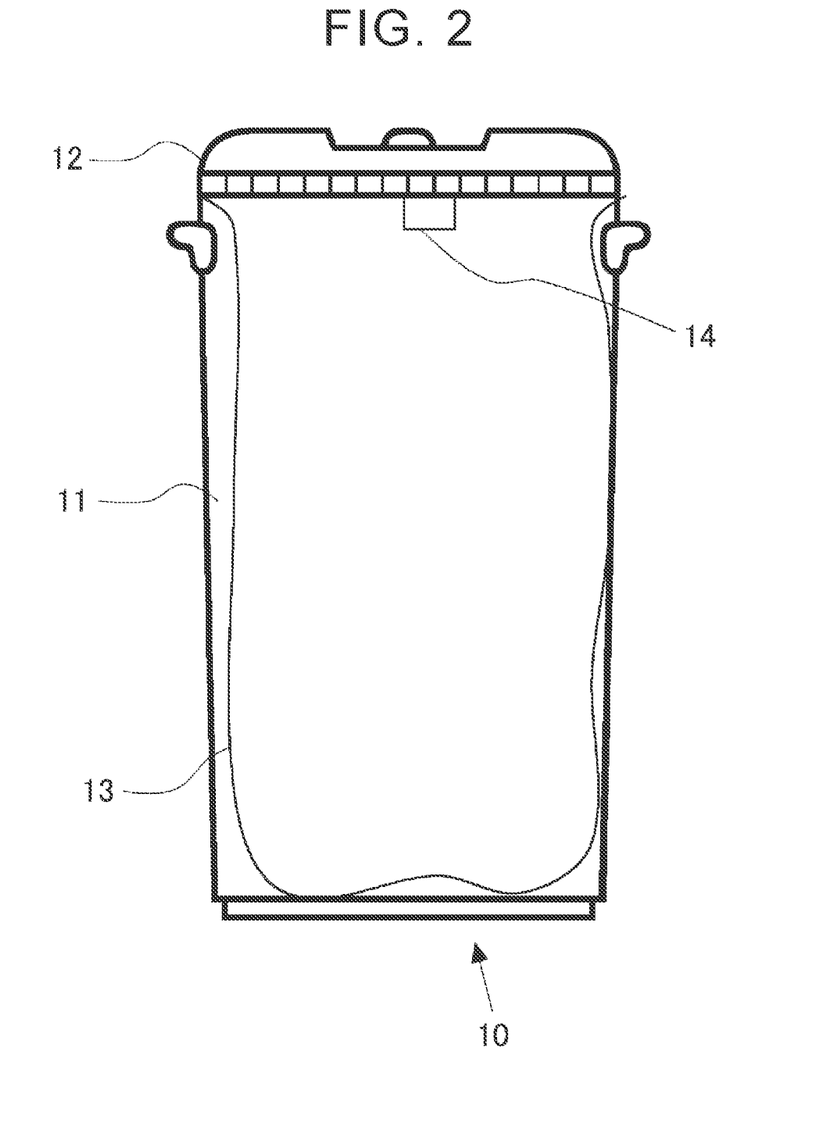
FIG. 2 is a diagram showing an outline of a trash can.

FIG. 2 is a diagram showing an outline of the trash can 10. The trash can 10 includes a main body 11 and a lid 12. A trash bag 13 is stored inside the main body 11. The trash bag 13 is disposed in the main body 11 so that the lid 12 side opens. An odor sensor 14 for detecting an odor is attached to the lid 12. The odor sensor 14 is attached to a position where the odor in the trash bag 13 can be detected. The lid 12 is not essential. In a case of the trash can 10 without the lid 12, the odor sensor 14 is installed on the main body 11 or around the main body 11. The odor sensor 14 does not need to be directly attached to the main body 11 or the lid 12.

Figure 3:
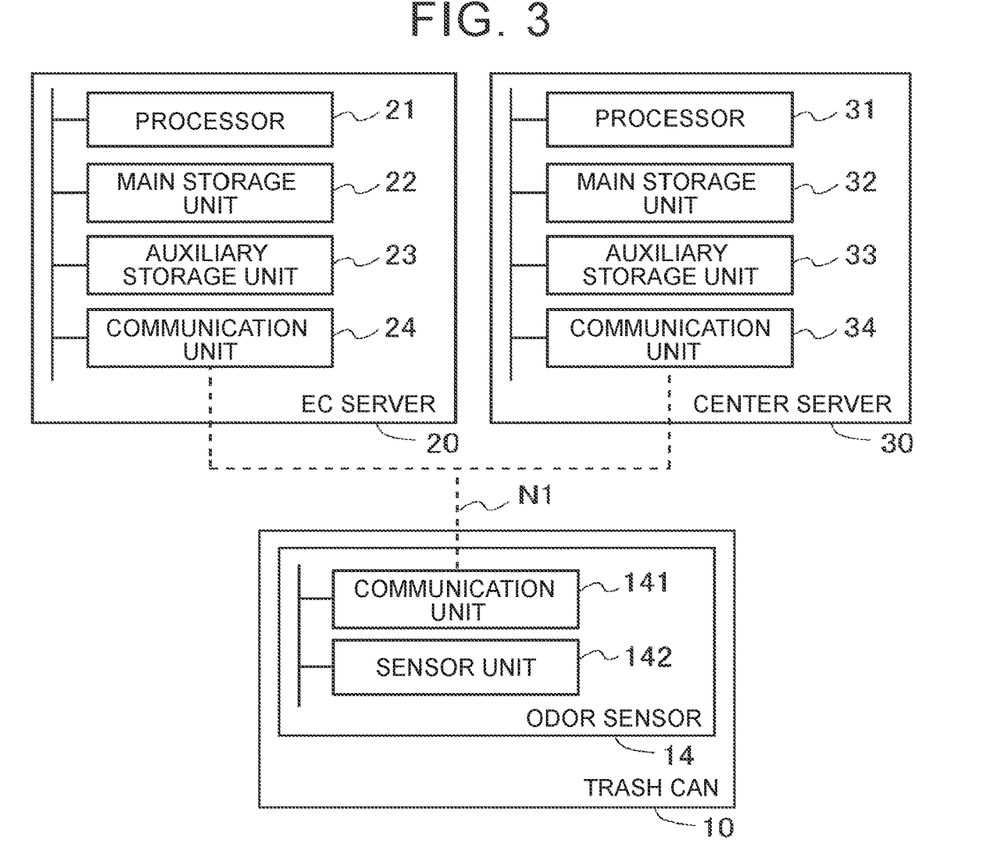
FIG. 3 is a block diagram schematically showing an example of respective configurations of the trash can, an EC server, and a server configuring the system according to the first embodiment.

Hardware configurations of the trash can 10, the EC server 20, and the center server 30 will be described with reference to FIG. 3. FIG. 3 is a block diagram schematically showing an example of respective configurations of the trash can 10, the EC server 20, and the center server 30 configuring the system 1 according to the present embodiment.

The center server 30 has a general computer configuration. The center server 30 includes a processor 31, a main storage unit 32, an auxiliary storage unit 33, and a communication unit 34. The components above are connected to each other by a bus. The processor 31 is an example of a control unit.

The processor 31 is a central processing unit (CPU), a digital signal processor (DSP), or the like. The processor 31 controls the center server 30 and performs various information processing calculations. The main storage unit 32 is a random access memory (RAM), a read-only memory (ROM), or the like. The auxiliary storage unit 33 is an erasable programmable ROM (EPROM), a hard disk drive (HDD), a removable medium, or the like. The auxiliary storage unit 33 stores an operating system (OS), various kinds of programs, various kinds of tables, and the like. The processor 31 loads the program stored in the auxiliary storage unit 33 into the work area of the main storage unit 32 and executes the program. Through execution of the program, each component is controlled. As a result, the center server 30 realizes the function that matches the predetermined purpose. The main storage unit 32 and the auxiliary storage unit 33 are computer-readable recording media. The center server 30 may be a single computer or may include a plurality of computers linked together. Further, the information stored in the auxiliary storage unit 33 may be stored in the main storage unit 32. Further, the information stored in the main storage unit 32 may be stored in the auxiliary storage unit 33. In the auxiliary storage unit 33, for example, information relating to the number of trash bags owned by the user is stored.

The communication unit 34 is a means for communicating with the trash can 10 and the EC server 20 via the network N1. The communication unit 34 is, for example, a local area network (LAN) interface board or a wireless communication circuit for wireless communication. The LAN interface board and the wireless communication circuit are connected to the network N1.

The EC server 20 is a computer that conducts electronic commerce, and at least trades products with the center server 30. The EC server 20 executes a process of receiving an order for a product from the center server 30, and executes a process of providing the ordered product to the user. The EC server 20 executes a process of notifying, for example, a distribution center, of a name of the product to be delivered and a delivery destination. Existing means such as a home delivery service can be used for actual delivery. Therefore, the description thereof will be omitted. The EC server 20 includes a processor 21, a main storage unit 22, an auxiliary storage unit 23, and a communication unit 24. Since the processor 21, the main storage unit 22, the auxiliary storage unit 23, and the communication unit 24 of the EC server 20 are the same as the processor 31, the main storage unit 32, the auxiliary storage unit 33, and the communication unit 34 of the center server 30, description thereof will be omitted.

Next, the trash can 10 outputs a signal according to the odor in the trash can 10. The odor sensor 14 of the trash can 10 has a communication unit 141 and a sensor unit 142. The components above are connected to each other by a bus.

The communication unit 141 is a communication means for connecting the odor sensor 14 to the network N1. The communication unit 141 is a circuit for communicating with other devices (for example, the center server 30) via the network N1 using wireless communication such as a mobile communication service (for example, a telephone communication network such as the fifth generation (5G), the fourth generation (4G), the third generation (3G), and long term evolution (LTE)), Wi-Fi (registered trademark), Bluetooth (registered trademark), or radio frequency identification (RFID). The sensor unit 142 is a sensor that outputs a signal corresponding to the odor. The sensor unit 142 is, for example, an element in which an electrical resistance changes according to the odor intensity. The odor detected by the sensor unit 142 is transmitted to the center server 30 via the communication unit 141 at predetermined time intervals, for example. In the following, the information transmitted from the odor sensor 14 may be described as being transmitted from the trash can 10.

Figure 4:
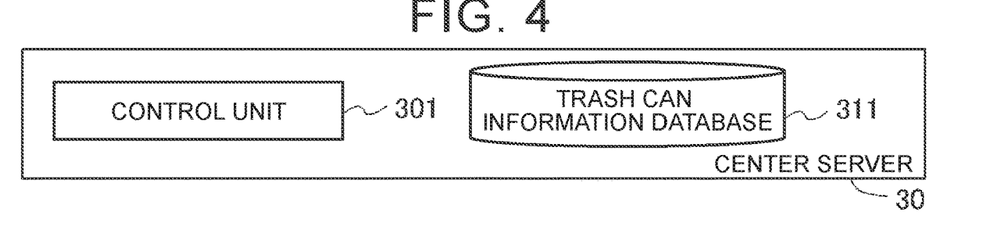
FIG. 4 is a diagram showing an example of a functional configuration of the server.

Next, the function of the center server 30 will be described. FIG. 4 is a diagram showing an example of a functional configuration of the center server 30. The center server 30 includes a control unit 301 and a trash can database (DB) 311 as functional components. The processor 31 of the center server 30 executes the process of the control unit 301 using a computer program stored in the main storage unit 32. However, a part of the control unit 301 may be executed by a hardware circuit.

The trash can DB 311 is constructed in a manner such that a program of a database management system (DBMS) executed by the processor 31 manages data stored in the auxiliary storage unit 33. The trash can DB 311 is, for example, a relational database.

By providing the trash can 10 or the EC server 20 with a function of the center server 30, the center server 30 can be omitted.

The control unit 301 receives the intensity of the odor (hereinafter, also referred to as the odor intensity) from the trash can 10, and adds one (1) to the exchange counter when the odor intensity decreases by a predetermined value or more from the previous reception. The odor intensity is, for example, a numerical value of the odor intensity perceived by a human being based on the output value of the odor sensor 14. The exchange counter is a counter that counts the number of times the trash bag 13 is exchanged. The predetermined value of the odor intensity is the odor intensity that can be decreased when the trash bag 13 is exchanged, and is predetermined.

As described above, the control unit 301 counts the number of times the trash bag 13 is exchanged. When the exchange counter reaches or exceeds a predetermined value, the control unit 301 places an order of the trash bag 13 to the EC server 20. The predetermined value may be set based on the remaining quantity of the user's trash bag 13. For example, the predetermined value may be set such that the trash bag 13 arrives before the remaining quantity of the trash bag 13 becomes zero. In this case, for example, the user registers the initial value of the remaining quantity of the trash bag 13 in the center server 30 by using a terminal. The number of trash bags 13 to be ordered at this time may be, for example, the same as the number indicated by the exchange counter. Thus, the predetermined value of the exchange counter may be set to an integral multiple of a sales unit of the trash bag 13.

Figure 5:
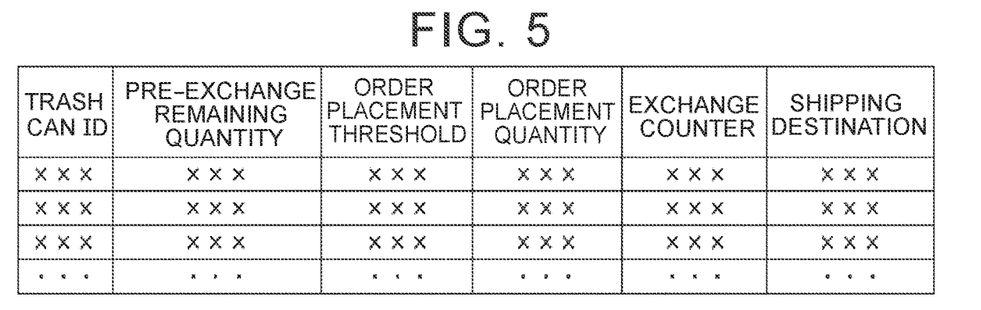
FIG. 5 is a diagram illustrating a configuration of a trash can information table stored in a trash can database (DB)

The control unit 301 stores the initial value of the remaining quantity of the trash bag 13 and the exchange counter in the trash can DB 311. FIG. 5 is a diagram illustrating a configuration of a trash can information table stored in the trash can DB 311. The trash can information table has fields of each of a trash can ID, a pre-exchange remaining quantity, an order placement threshold, an order placement quantity, an exchange counter, and a shipping destination. The trash can ID field is a field in which the identification information (trash can ID) of the trash can 10 is input. The trash can ID is given by the control unit 301. The pre-exchange remaining quantity field is a field in which the remaining quantity of the trash bag 13 before the user consumes the trash bag 13 is input. The initial value of the pre-exchange remaining quantity is the number of the inventory of the trash bag 13 input by the user via the terminal. The order placement threshold field is a field in which the remaining quantity of the trash bag 13 serving as a threshold (order placement threshold) for placing an order of the trash bag 13 by the control unit 301 is input. The order placement threshold may be set by the user, or may be set by the control unit 301. The order placement quantity field is a field in which the number (order placement quantity) of the trash bag 13 to be ordered at one time is input. The order placement quantity may also be set by the user, or may be set by the control unit 301. Further, the order placement quantity may be the same as the number indicated by the exchange counter. The exchange counter field is a field in which the numerical value of the exchange counter is input. The control unit 301 updates the exchange counter field based on the odor intensity transmitted from the trash can 10. The shipping destination field is a field in which information on the user who receives the shipped trash bag 13 is input. In the shipping destination field, for example, information regarding the user's address, name, telephone number, e-mail address, and the like is input.

The control unit 301 calculates a value acquired by subtracting the ordering threshold value from the pre-exchange remaining quantity as the number of times the trash bag 13 is exchanged in which an order placement for the trash bag 13 is required. When the exchange counter reaches or exceeds the number of times the trash bag 13 is exchanged with which the order placement is required, the order is placed to the EC server 20 in accordance with the order placement quantity. At this time, the control unit 301 transmits the order placement quantity and the shipping destination to the EC server 20. When the order placement is completed, the control unit 301 updates the pre-exchange remaining quantity by inputting the total value acquired by adding the value of the exchange counter to the order placement threshold to the pre-exchange remaining quantity. The control unit 301 resets the exchange counter.

Figure 6:
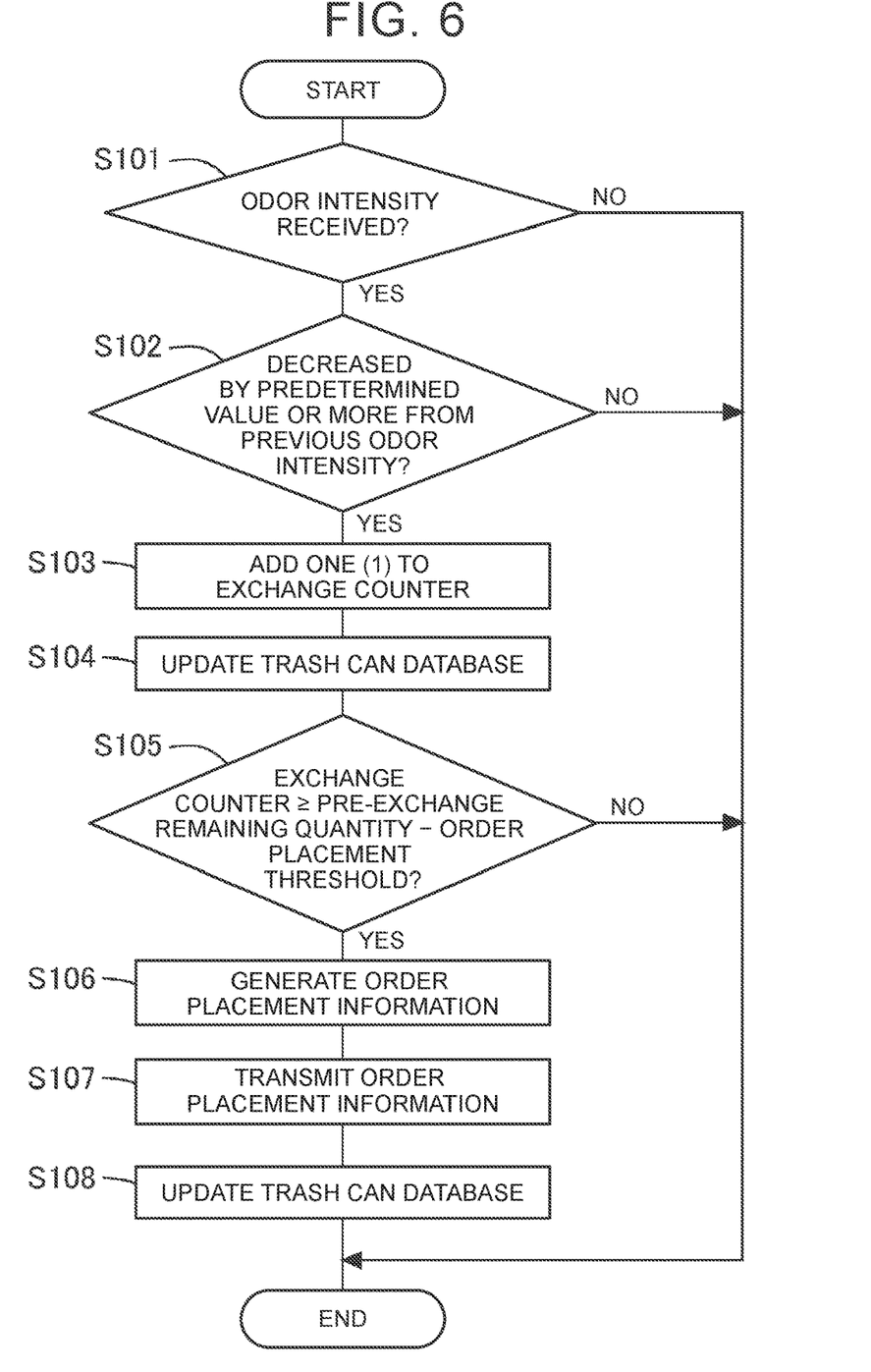
FIG. 6 is a flowchart showing a flow of the process of placing an order of a trash bag by the server.

Next, the process of placing an order of the trash bag 13 by the center server 30 will be described. FIG. 6 is a flowchart showing a flow of the process of placing an order of the trash bag 13 by the center server 30. The flowchart shown in FIG. 6 is executed for each trash can 10 at predetermined time intervals. The description will be made on assumption that, in the trash can information table, necessary information is already stored in each of the trash can ID field, the pre-exchange remaining quantity field, the order placement threshold field, the order placement quantity field, and the shipping destination field.

In step S101, the control unit 301 determines whether the odor intensity has been received from the trash can 10. When an affirmative determination is made in step S101, the process proceeds to step S102, and when a negative determination is made, the routine is terminated. In step S102, the control unit 301 determines whether the odor intensity received in step S101 is decreased by a predetermined value or more from the odor intensity received last time in a calculation cycle. As a result, it is determined whether the trash bag 13 has been exchanged. The predetermined value referred herein is stored in advance in the auxiliary storage unit 33 as the decreasing amount of the odor intensity when the trash bag 13 is exchanged. When an affirmative determination is made in step S102, the process proceeds to step S103, and when a negative determination is made, the routine is terminated.

In step S103, the control unit 301 counts up the exchange counter by adding one (1) to the exchange counter. As a result, the number of times the trash bag 13 is exchanged is counted. In step S104, the control unit 301 updates the trash can DB 311 by storing the exchange counter calculated in step S103 in the trash can DB 311.

In step S105, the control unit 301 determines whether the exchange counter is equal to or greater than the value acquired by subtracting the order placement threshold from the pre-exchange remaining quantity. That is, the control unit 301 determines whether the number of times the trash bag 13 is exchanged reaches the number of times an order needs to be placed for the trash bag 13. When an affirmative determination is made in step S105, the process proceeds to step S106, and when a negative determination is made, the routine is terminated.

In step S106, the control unit 301 generates order placement information. The order placement information is information required for delivering the trash bag 13 to the user, and is information transmitted by the control unit 301 to the EC server 20. The shipping information includes information on the order placement quantity of the trash bag 13 and information on the shipping destination of the trash bag 13. The control unit 301 generates the shipping information based on the information stored in the trash can DB 311. In step S107, the control unit 301 transmits the order placement information to the EC server 20. Subsequently, in step S108, the control unit 301 updates the trash can DB 311. At this time, the control unit 301 resets the exchange counter, and further, inputs the total value acquired by adding the value of exchange counter to the order placement threshold to the pre-exchange remaining quantity.

As described above, according to the present embodiment, the consumption quantity of the trash bag 13 can be estimated based on the odor of the trash can 10, and an order can be placed for the trash bag 13 according to the consumption quantity of the trash bag 13. Thus, the user can replenish the trash bag 13 at an appropriate time without managing the inventory of the trash bag 13.

Second Embodiment

Figure 7:
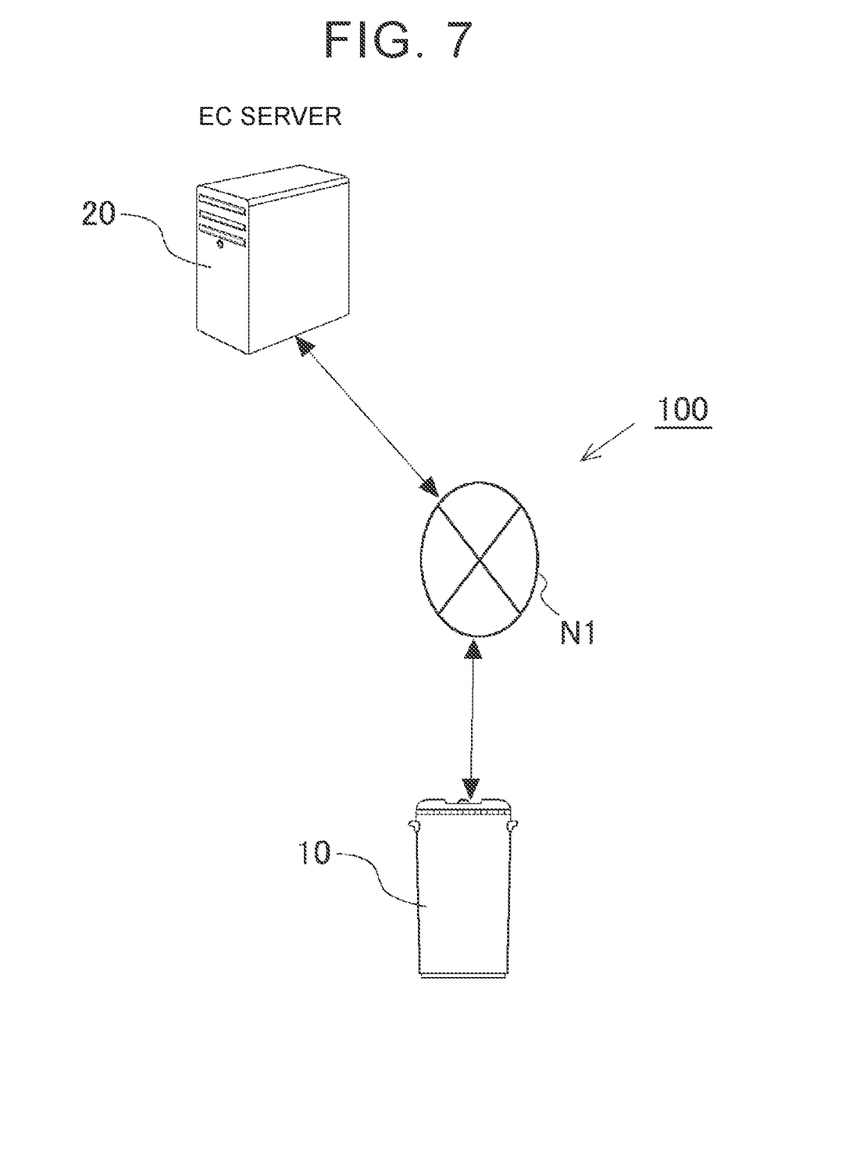
FIG. 7 is a diagram showing a schematic configuration of a system according to a second embodiment.

FIG. 7 is a diagram showing a schematic configuration of a system 100 according to the present embodiment. The system 100 is a system in which the trash can 10 detects the exchange of the trash bag by the odor sensor, and that places an order of the trash bag to the EC server 20 when the number of times the trash bag is exchanged is equal to or more than a predetermined value.

In the example of FIG. 7, the system 100 includes the trash can 10 and the EC server 20. The trash can 10 and the EC server 20 are connected to each other by the network N1. Since the hardware and functions of the EC server 20 are the same as those in the first embodiment, the trash can 10 will be mainly described.

Figure 8:
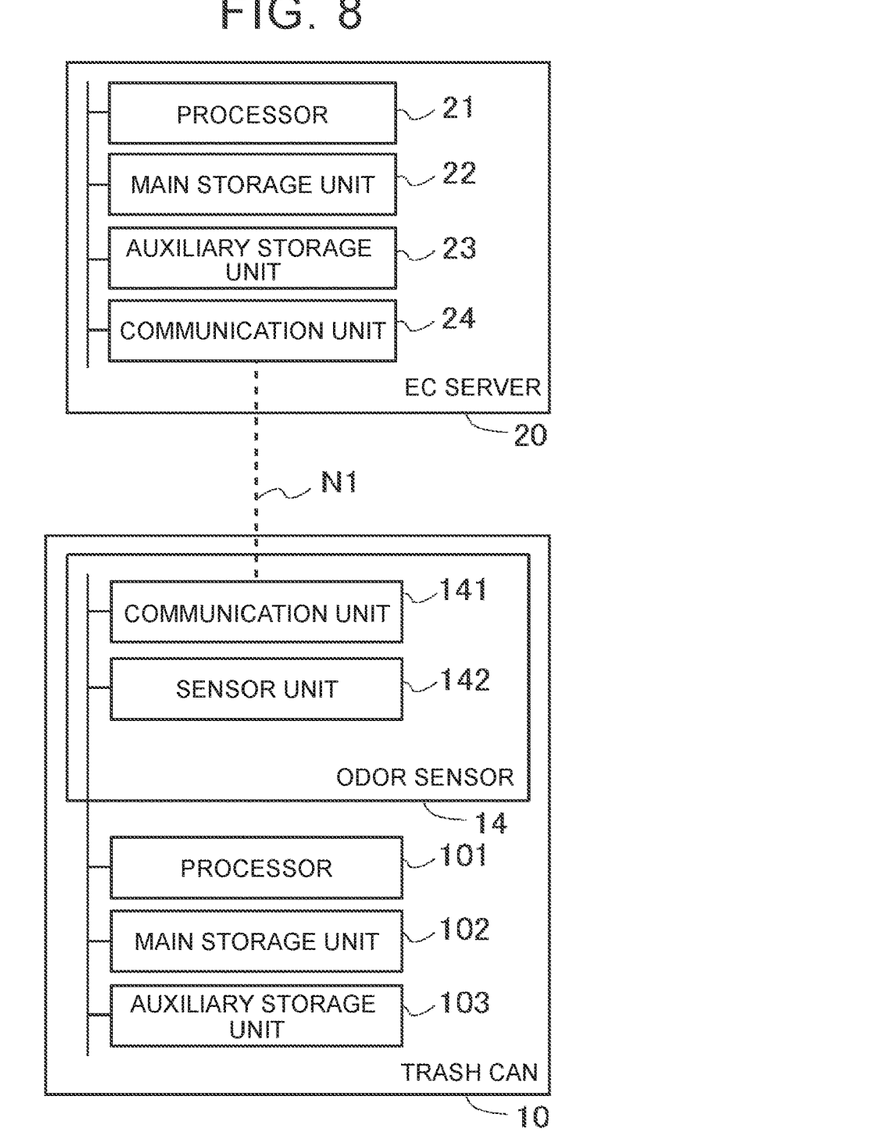
FIG. 8 is a block diagram schematically showing an example of respective configurations of the trash can and an EC server configuring the system according to the second embodiment.

First, the hardware configuration of the trash can 10 will be described. FIG. 8 is a block diagram schematically showing an example of respective configurations of the trash can 10 and the EC server 20 configuring the system 100 according to the second embodiment. The trash can 10 has a processor 101, a main storage unit 102, and an auxiliary storage unit 103 in addition to the odor sensor 14 described in the first embodiment. The components above are connected to each other by a bus. Since the processor 101, the main storage unit 102, and the auxiliary storage unit 103 of the trash can 10 are the same as the processor 31, the main storage unit 32, the auxiliary storage unit 33 of the center server 30, description thereof will be omitted. The processor 101 is an example of a control unit.

Figure 9:
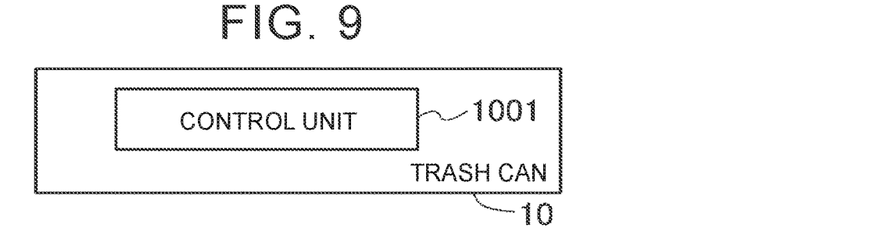
FIG. 9 is a diagram illustrating a functional configuration of a trash can.

Next, the function of the trash can 10 will be described. FIG. 9 is a diagram illustrating the functional configuration of the trash can 10. The trash can 10 includes a control unit 1001 as a functional component. The processor 101 of the trash can 10 executes the process of the control unit 1001 using a computer program stored in the main storage unit 102. However, a part of the control unit 1001 may be executed by a hardware circuit.

The control unit 1001 detects the odor intensity of the trash can 10 by the odor sensor 14, and adds one (1) to the exchange counter when the odor intensity decreases by a predetermined value or more from the previously detected value. The predetermined value of the odor intensity is the odor intensity that can be decreased when the trash bag 13 is exchanged, and is predetermined. As described above, the control unit 1001 counts the number of times the trash bag 13 is exchanged. When the exchange counter reaches or exceeds a predetermined value, the control unit 1001 places an order of the trash bag 13 to the EC server 20. The predetermined value of the exchange counter may be set based on the remaining quantity of the user's trash bag 13. For example, the predetermined value may be set such that the trash bag 13 arrives before the remaining quantity of the trash bag 13 becomes zero. In this case, for example, the user registers the initial value of the remaining quantity of the trash bag 13 in the trash can 10 by using the terminal. The number of trash bags 13 to be ordered at this time may be, for example, the same as the number indicated by the exchange counter. Therefore, the predetermined value may be set to an integral multiple of the sales unit of the trash bag 13.

The auxiliary storage unit 103 of the trash can 10 stores information on the trash can ID, the pre-exchange remaining quantity, the order placement threshold, the order placement quantity, the exchange counter, and the shipping destination. The trash can ID is provided in advance. The pre-exchange remaining quantity is the remaining quantity of the trash bag 13 before the user consumes the trash bag 13. The initial value of the pre-exchange remaining quantity is the number input by the user via the terminal. The ordering threshold is the remaining quantity of the trash bag 13 that is the threshold (ordering threshold) in which the control unit 1001 places an order for the trash bag 13. The order placement quantity is the number of trash bags 13 (order placement quantity) to be ordered at one time. The order placement threshold and the order placement quantity may be set by the user. Further, the order placement quantity may be the same as the number indicated by the exchange counter. The shipping destination is information on a user who receives the trash bag 13 shipped by the EC server 20. The shipping destination is, for example, the user's address, name, telephone number, e-mail address, and the like.

The control unit 1001 calculates a value acquired by subtracting the ordering threshold value from the pre-exchange remaining quantity as the number of times the trash bag 13 is exchanged in which an order placement for the trash bag 13 is required. When the exchange counter reaches or exceeds the number of times the trash bag 13 is exchanged with which the order placement is required, the order is placed to the EC server 20 in accordance with the order placement quantity. At this time, the control unit 1001 transmits, to the EC server 20, the order placement quantity and the shipping destination. When the order placement is completed, the control unit 1001 updates the pre-exchange remaining quantity by inputting the total value acquired by adding the value of the exchange counter to the order placement threshold to the pre-exchange remaining quantity. The control unit 1001 resets the exchange counter.

Figure 10:
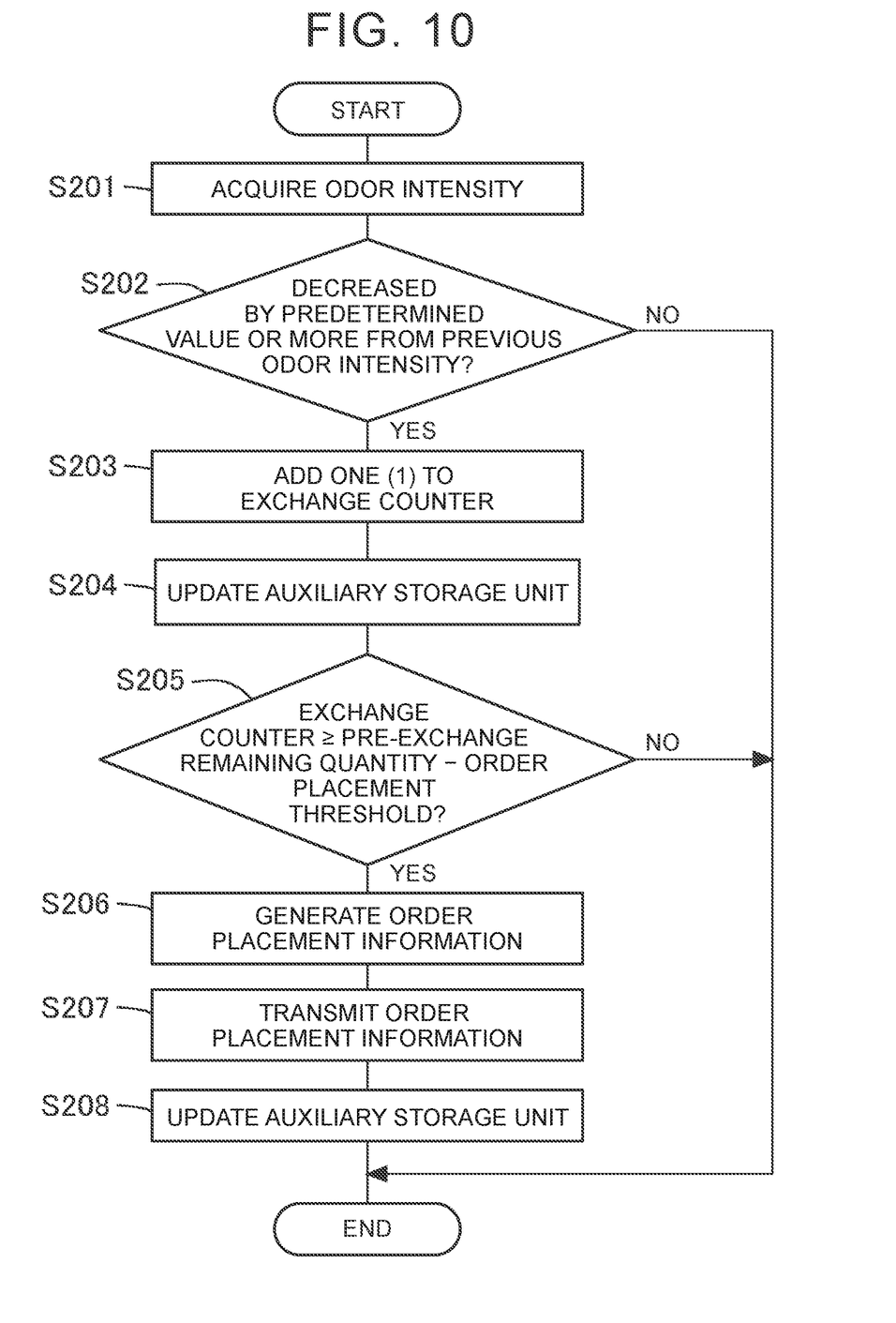
FIG. 10 is a flowchart showing a flow of a process in which the trash can places an order for the trash bag.

Next, a process in which the trash can 10 places an order of the trash bag 13 will be described. FIG. 10 is a flowchart showing a flow of a process in which the trash can 10 places an order of the trash bag 13. The flowchart shown in FIG. 10 is executed for the trash can 10 at predetermined time intervals. It is assumed that the trash can ID, the pre-exchange remaining quantity, the order placement threshold, the order placement quantity, and the shipping destination information are already stored in the auxiliary storage unit 103.

In step S201, the control unit 1001 acquires the odor intensity from the odor sensor 14. In step S202, the control unit 1001 determines whether the odor intensity acquired in step S101 is decreased by a predetermined value or more from the odor intensity acquired last time in the calculation cycle. As a result, it is determined whether the trash bag 13 has been exchanged. The predetermined value is stored in advance in the auxiliary storage unit 103 as the decreasing amount of the odor intensity when the trash bag 13 is exchanged. When an affirmative determination is made in step S202, the process proceeds to step S203, and when a negative determination is made, the routine is terminated.

In step S203, the control unit 1001 counts up the exchange counter by adding one (1) to the exchange counter. As a result, the number of times the trash bag 13 is exchanged is counted. In step S204, the control unit 1001 updates the auxiliary storage unit 103 by storing the exchange counter calculated in step S203 in the auxiliary storage unit 103.

In step S205, the control unit 1001 determines whether the exchange counter is equal to or greater than the value acquired by subtracting the order placement threshold from the pre-exchange remaining quantity. That is, the control unit 1001 determines whether the number of times the trash bag 13 is exchanged reaches the number of times an order needs to be placed for the trash bag 13. When an affirmative determination is made in step S205, the process proceeds to step S206, and when a negative determination is made, the routine is terminated.

In step S206, the control unit 1001 generates order placement information. The order placement information is information required for delivering the trash bag 13 to the user, and is information transmitted by the control unit 1001 to the EC server 20. The shipping information includes information on the order placement quantity of the trash bag 13 and information on the shipping destination of the trash bag 13. In step S207, the control unit 1001 transmits the order placement information to the EC server 20. Subsequently, in step S208, the control unit 1001 updates the auxiliary storage unit 103. At this time, the control unit 1001 resets the exchange counter, and further, inputs the total value acquired by adding the value of exchange counter to the order placement threshold to the pre-exchange remaining quantity.

As described above, according to the present embodiment, the consumption quantity of the trash bag 13 can be estimated based on the odor of the trash can 10, and an order can be placed for the trash bag 13 according to the consumption quantity of the trash bag 13. Thus, the user can replenish the trash bag 13 at an appropriate time without managing the inventory of the trash bag 13.

Other Embodiments

The above-described embodiment is merely an example, and the present disclosure may be appropriately modified and implemented without departing from the scope thereof.

The processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function. For example, the EC server 20 may have a part or all of the functions of the center server 30. Further, for example, the center server 30 may have a part or all of the functions of the EC server 20.

Further, in the above embodiment, when the odor intensity detected by the odor sensor 14 decreases by a predetermined value or more, it is determined that the trash bag has been exchanged. However, not limited to this, it may be determined that the trash bag has been exchanged, when the weight of the trash can 10 is decreased by a predetermined value or more, when the height of the trash in the trash can 10 is decreased by a predetermined value or more, or when the volume of the trash in the trash can 10 is decreased by a predetermined value or more, for example. For example, if a sensor that detects the weight is installed at the bottom of the trash can, it can be determined that the trash bag has been exchanged when the weight of the trash in the trash bag decreases by a predetermined amount or more in a predetermined period. In this case, for example, in step S201 of FIG. 10, the weight is detected, and it is determined whether the weight is decreased by a predetermined amount or more from the weight previously detected in step S202. The subsequent process is the same as the process shown in FIG. 10.

Further, in the above embodiment, the placement of the order of the trash bag 13 has been described. However, instead of this, it is possible to place an order of a product related to trash. For example, if there is a trash can for throwing away trash generated after using a specific product, the number of times the trash bag of the trash can is exchanged correlates with a consumption quantity of the specific product. For example, there is a correlation between the number of times the trash bag 13 of the trash can 10 placed next to a beverage vending machine is exchanged and the number of products sold by the vending machine. If this correlation is acquired, it is possible to place an order for a specific product at an appropriate timing based on the number of times the trash bag is exchanged.

The present disclosure can also be implemented by supplying a computer with a computer program that implements the functions described in the above embodiments, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read only memory (ROM), a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing device comprising a controller configured to execute:
    acquiring information on whether there is trash in a trash bag disposed in a trash can; and
    placing an order for a product related to the trash, the product being sold by a beverage vending machine placed in vicinity of the trash can, based on the number of times a state in which there is the trash in the trash bag is changed to a state in which there is no trash in a trash bag disposed in the trash can.

2. The information processing device according to claim 1, wherein the controller is configured to:
    acquire a detection value of a sensor that is configured to detect an odor and that is disposed in the trash can, as information on whether there is the trash in the trash bag disposed in the trash can; and
    determine that the state in which there is the trash in the trash bag has changed to the state in which there is no trash in the trash bag when the detection value of the sensor that is configured to detect the odor is decreased by a predetermined amount or more in a predetermined period.

3. The information processing device according to claim 1, wherein the controller is configured to:
    acquire a detection value of a sensor that is configured to detect an amount of trash in the trash bag as information on whether there is the trash in the trash bag disposed in the trash can; and
    determine that the state in which there is the trash in the trash bag is changed to the state in which there is no trash in the trash bag when the detection value of the sensor that is configured to detect the amount of the trash is decreased by a predetermined amount or more in a predetermined period.

4. The information processing device according to claim 1, wherein the controller is configured to place an order for the product related to the trash when the number of times the state in which there is the trash in the trash bag is changed to the state in which there is no trash in the trash bag is a predetermined number of times or more.

5. The information processing device according to claim 1, wherein the controller is configured to:
    count the number of times the state in which there is the trash in the trash bag is changed to the state in which there is no trash in the trash bag;
    calculate a remaining quantity of trash bags based on the counted number of times; and
    place the order for the product related to the trash when the calculated remaining quantity of trash bags is decreased to a threshold for placing an order for a trash bag.

6. The information processing device according to claim 1, wherein the controller is configured to reset the number of times the state in which there is the trash in the trash bag is changed to the state in which there is no trash in the trash bag when the order is placed for the product related to the trash.

7. An information processing method comprising executing the following by a computer:
    acquiring information on whether there is trash in a trash bag disposed in a trash can; and
    placing an order for a product related to the trash, the product being sold by a beverage vending machine placed in vicinity of the trash can, based on the number of times a state in which there is the trash in the trash bag is changed to a state in which there is no trash in a trash bag disposed in the trash can.

8. The information processing method according to claim 7, wherein the computer:
    acquires a detection value of a sensor that is configured to detect an odor and that is disposed in the trash can, as information on whether there is the trash in the trash bag disposed in the trash can; and
    determines that the state in which there is the trash in the trash bag is changed to the state in which there is no trash in the trash bag when the detection value of the sensor that is configured to detect the odor is decreased by a predetermined amount or more in a predetermined period.

9. The information processing method according to claim 7, wherein the computer:
    acquires a detection value of a sensor that is configured to detect an amount of trash in the trash bag as information on whether there is the trash in the trash bag disposed in the trash can; and
    determines that the state in which there is the trash in the trash bag is changed to the state in which there is no trash in the trash bag when the detection value of the sensor that is configured to detect the amount of the trash is decreased by a predetermined amount or more in a predetermined period.

10. The information processing method according to claim 7, wherein the computer is configured to place the order for the product when the number of times the state in which there is the trash in the trash bag is changed to the state in which there is no trash in the trash bag is a predetermined number of times or more.

11. The information processing method according to claim 7, wherein the computer:
    counts the number of times the state in which there is the trash in the trash bag is changed to the state in which there is no trash in the trash bag;
    calculates a remaining quantity of trash bags based on the counted number of times; and
    places the order for the product related to the trash when the calculated remaining quantity of trash bags is decreased to a threshold for placing an order for a trash bag.

12. The information processing method according to claim 7, wherein the computer resets the number of times the state in which there is the trash in the trash bag is changed to the state in which there is no trash in the trash bag when the order is placed for the product related to the trash.

13. A system, comprising:
a trash can configured to transmit information on whether there is trash in a trash bag disposed in the trash can; and
a server configured to (i) receive information on whether there is the trash in the trash bag, and (ii) place an order for a product related to the trash, the product being sold by a beverage vending machine placed in vicinity of the trash can, based on the number of times a state in which there is the trash in the trash bag is changed to a state in which there is no trash in a trash bag disposed in the trash can.

14. The system according to claim 13, wherein the trash can is configured to transmit to the server, a detection value of a sensor that is configured to detect an odor and that is disposed in the trash can, as information on whether there is the trash in the trash bag disposed in the trash can.

15. The system according to claim 14, wherein the server is configured to determine that the state in which there is the trash in the trash bag is changed to the state in which there is no trash in the trash bag when the detection value of the sensor that is configured to detect the odor is decreased by a predetermined amount or more in a predetermined period.

16. The system according to claim 13, wherein the trash can is configured to transmit to the server, a detection value of a sensor that is configured to detect an amount of trash in the trash bag as information on whether there is the trash in the trash bag disposed in the trash can.

17. The system according to claim 16, wherein the server is configured to determine that the state in which there is the trash in the trash bag is changed to the state in which there is no trash in the trash bag when the detection value of the sensor that is configured to detect the amount of the trash is decreased by a predetermined amount or more in a predetermined period.

18. The system according to claim 13, wherein the server is configured to place the order for the product when the number of times the state in which there is the trash in the trash bag is changed to the state in which there is no trash in the trash bag is a predetermined number of times or more.

19. The system according to claim 13, wherein the server is configured to:
count the number of times the state in which there is the trash in the trash bag is changed to the state in which there is no trash in the trash bag;
calculate a remaining quantity of trash bags based on the counted number of times; and
place the order for the product related to the trash when the calculated remaining quantity of trash bags is decreased to a threshold for placing an order for a trash bag.

20. The system according to claim 19, wherein a plurality of trash cans is provided as the trash can, and the server stores the remaining quantity of trash bags and the threshold for placing an order for a trash bag for each of the trash cans.

21. The system according to claim 13, wherein the server is configured to reset the number of times the state in which there is the trash in the trash bag is changed to the state in which there is no trash in the trash bag when an order is placed for the product related to the trash.

22. A non-transitory storage medium storing instructions that are executable by one or more processors and that cause the one or more processors to perform functions comprising:
acquiring information on whether there is trash in a trash bag disposed in a trash can; and
placing an order for a product related to the trash, the product being sold by a beverage vending machine placed next to the trash can, based on the number of times a state in which there is the trash in the trash bag is changed to a state in which there is no trash.

* * * * *